Sept. 18, 1962      O. G. LEWIS      3,054,287
VEHICLE HOLD-DOWN DEVICE

Filed Aug. 20, 1959      5 Sheets-Sheet 1

Oliver G. Lewis     Inventor

By *Ernest V. Haines*

Patent Attorney

Sept. 18, 1962     O. G. LEWIS     3,054,287
VEHICLE HOLD-DOWN DEVICE

Filed Aug. 20, 1959     5 Sheets-Sheet 2

Oliver G. Lewis     Inventor

By *Ernest V. Haines*

Patent Attorney

Sept. 18, 1962          O. G. LEWIS          3,054,287
VEHICLE HOLD-DOWN DEVICE

Filed Aug. 20, 1959          5 Sheets-Sheet 3

Oliver G. Lewis      Inventor

By *Ernest V. Haines*

Patent Attorney

Sept. 18, 1962

O. G. LEWIS 3,054,287

VEHICLE HOLD-DOWN DEVICE

Filed Aug. 20, 1959

Oliver G. Lewis INVENTOR

BY Ernest V. Haines

PATENT ATTORNEY

United States Patent Office 3,054,287
Patented Sept. 18, 1962

3,054,287
VEHICLE HOLD-DOWN DEVICE
Oliver G. Lewis, Westfield, N.J., assignor to Esso Research and Engineering Company, a corporation of Delaware
Filed Aug. 20, 1959, Ser. No. 835,061
7 Claims. (Cl. 73—117)

The present invention relates to a vehicle hold-down device. More specifically, it relates to a hold-down or clamping device and mechanism designed to retain test automobiles on a chassis dynamometer so as to hold the rear tires of the vehicle centered on the traction rolls in perfect alignment, and at the same time, to not impose any substantially increased vertical component of force upon the tires of the test vehicle.

The testing of automotive vehicles on chassis dynamometers having traction rolls has, of course, been carried out by others before the present discoveries were made. However, in such operations it has been customary to either chock the front wheels of the vehicle to hold it in place or to use tie-down cables or chains, at the front and rear of the vehicle, connected with either the bumpers or frame of the vehicle and tensioned to some tie-down point or points in the floor. The chocking of the front wheels imparts undue load upon the front suspension system to such an extent that it may cause the system to give way or become misaligned. Also, if the front wheels are not held down into the chocks by tie-down bails, there is great likelihood that modern high powered motor vehicles may jump out of or over these chocks which, of course, is hazardous to engineers and mechanics necessarily attending the running of such dynamometer tests. If the wheel bails are used, the wheels are held so rigid that there is again danger of damage to the steering mechanism, especially in the case of modern motor vehicles having power steering units. In dynamometer tests employing front wheel chocking, the rear of the vehicle is permitted to swing or bounce particularly if the rear tires should fail while the vehicle is on test. There is also undue slippage between the rear wheels and the traction rolls when employing the conventional hold-down methods. Also, since the tie-down members in both the chain and cable tie-down methods are at an angle to the horizontal, a vertical component of tie-down restraining force is imparted to the vehicle frame and then to the vehicle wheels and tires. The use of tie-down cables or chains for clamping an automotive vehicle on the dynamometer rolls fails to simulate the action of the wheels on a natural road surface under actual driving conditions, thus causing excessive tire wear and frequent blow-outs because of excessive pressure between the tire surface and the traction rolls.

The novel hold-down mechanism of the present invention attaches to the rear axle housing of the automotive vehicle under test, and is so attached as to be at the point of force application. It does not have to allow for torque reaction in the springs and may be tightened to allow only fractions of an inch in movement while the vehicle is under dynamometer test. This hold-down mechanism is designed and operated so that it is readily engaged and disengaged from the rear axle housing and readily fits all makes and models of automobiles having rigid rear axle housings. As will be seen from the fuller description hereinafter set forth, the clamping mechanism itself, when in clamped position and while the vehicle is on dynamometer test, remains in an essentially horizontal position so that the vertical force components which are so detrimental to excessive tire wear and slippage are completely eliminated and the test vehicle during testing more closely approaches and simulates actual road operation.

Briefly, the novel vehicle hold-down mechanism of the present invention is comprised of two parts, a clamping mechanism secured in both forward motion and rearward motion by chains or cables under spring tension and a carriage, in contact with but not integral with the hold-down clamping mechanism, which is used to raise and lower the clamping hold-down device into the position or to remove it from position at the conclusion of vehicle testing.

The novel hold-down device and accompanying carriage are best described by reference to the accompanying drawings.

Figure 1:
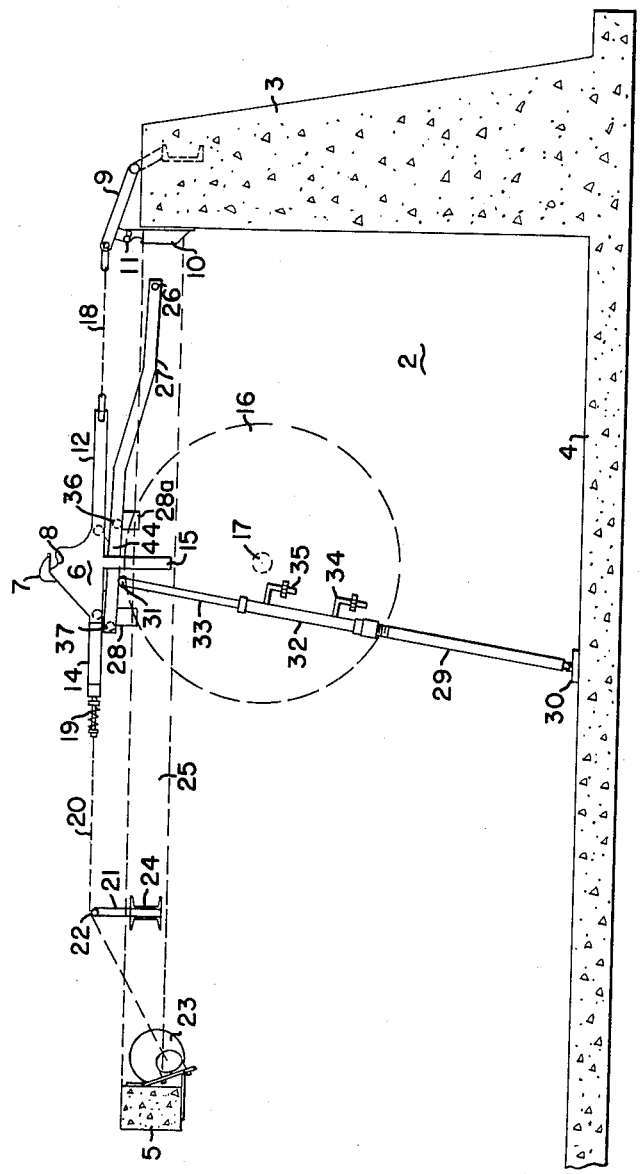
FIG. 1 shows an elevation, partially in section, of a dynamometer pit positioned within which is shown a novel hold-down mechanism, the carriage therefor, and the relative positions of the various components of the device with reference to the dynamometer pit and to the traction rolls of the dynamometer unit.

Referring now in detail to the drawings, FIG. 1 depicts in elevation a dynamometer pit 2 bounded by concrete, brick, or other type, walls and floor. The rear wall 3 is integral with the floor 4 and the forward wall or support 5 is shown only partially. The vehicle, when placed on the chassis dynamometer, is facing toward the forward wall 5 with the rear wheels being centered by means of C-clamp 7 and notched housing 8 on the center line 17 of the traction rolls 16 and 16a. In order to institute a dynamometer test and, prior to driving the test vehicle on to the dynamometer stand, the clamping mechanism 6 is lowered from the position shown in FIG. 1, the position shown in FIG. 1 being the position of the hold-down mechanism while a car is on test. This is accomplished by first loosening the tension mechanism and chains or cables by operating hoist or winch 23 to loosen roller chain or cable 20 which, in turn, relieves tension on spring 19 and causes the chain or cable 18 to also slacken. Hydraulic jack 32 then has pressure applied by introducing hydraulic fluid into the line 35 and removing fluid through line 34. This permits the piston rod 33 to be retracted. Since piston rod 33 is secured to the under-carriage by a pinion or bolt 31, the under-carriage, which is secured to the floor by plate or bracket 30, is lowered while pivoting on pinions 26 and the pinion of bracket 30. Since the hold-down and clamping mechanism 6 rests by gravity on the under-carriage 44, it, in turn, is lowered sufficiently (usually about 12 to 16 inches) to permit the test car to be driven onto the dynamometer chassis. Hydraulic piston 15 is then operated, as will be discussed in greater detail hereinafter, to fully open C-clamp 7. By operation of the hydraulic jack 32, the clamping mechanism is raised to the point where spring C-clamp 7 will be approximately opposite the rear axle housing of the test vehicle. The hold-down mechanism 6 is then slid rearward, supported by the platform 44, until the rear axle housing centers in the notch 8, after which hydraulic piston 15 is operated in reverse fashion to close the C-clamp 7 and engage securely the clamp 7 on the rear housing of the test vehicle.

The length of chain or cable 18 is so designed that when it is fully extended and under tension notch 8 is in direct vertical center line relationship with the hub or axle and center line 17 of the traction rollers 16 and 16a. Also, chain 18 and connecting rigid horizontal arm 12, as well as connecting forward horizontal arm 14, will remain in substantially a horizontal position when under tension. The supporting links for adjusting the relative horizontal position of the clamping hold-down mechanism 6 is through an adjustment 11 on supplemental support 10 which is bolted to the dynamometer pit rear wall 3. Chain 18 is anchored by means of member 9 and clevis connection between member 9 and chain or cable 18 in the wall 3. Roller 22 is held in vertical position by support 21 resting or attached to I-beam 24. Tension is then applied by means of a hoist or winch 23, through vertically adjustable roller 22 and chain or cable 20. Sufficient tension is applied by means of hoist 23 to compress the spring element 19 so that, at all times while the vehicle is under test, the compression of spring 19 keeps the chain or cable units 18 and 20 under constant tension.

Once the clamp mechanism 6 has been securely attached to the rear axle housing and remains under hydraulic pressure by means of hydraulic cylinder 15 and once chain hoist or winch 23 maintains a constant tension on compression spring unit 19, the under-carriage 44 may be removed from its supporting relation and contact with the clamping mechanism. This is done by simply reversing the flow of hydraulic fluid in hydraulic jack 32 so that the clamping mechanism 6 and its accompanying cables ride free of any support from the under-carriage 44.

The under-carriage 44 comprises, as will be more fully hereinafter described, two tubular members 27 and 27a which are pivoted on the chassis dynamometer frame 25 and 25a by means of pinions 26 and 26a. Tubular cross members 36 and 37 aid in making the under-carriage rigid. As shown in FIG. 1, microswitches 28 and 28a are secured to the underside of tubular member 27. They are connected through tubular member 27 by means of connecting rods with striker plates or alarm pads 39 and 39a (not shown in FIG. 1) on the upper side of tubular member 27 so that they extend beyond the upper portion of tubular member 27. The microswitches are, in turn, connected with the control mechanism which is attached to the ignition of the automotive vehicle during test and when actuated shut down the test run. In ordinary practice and while a vehicle is on dynamometer test, the clamp mechanism carriage is maintained in a stationary position so that the striker plates or alarm pads 39 and 39a connected to the microswitches are about ¾ of an inch below the base of the hold-down mechanism 6. This is a desirable feature of the instant novel construction and arrangement for the reason that, if during test, a tire failure should occur, the rear axle will tend to drop down some 3 or 4 inches when the air is released from the tire. The clamp mechanism 6, in turn, will tend to be lowered by some 3 or 4 inches and will then come to rest on the under-carriage. As it attempts to do so, the base of the clamp mechanism 6 first strikes the striker plates which actuates one or more microswitches which immediately results in shutting off the engine of the car and immediately discontinuing the test. Such a device not only minimizes hazards inherently connected with dynamometer tests, but at the same time tends to minimize destruction of tires, wheels and wheel rims to say nothing of injury to the traction rolls which can be great in the absence of such safety devices due to the tremendous kinetic energy built up in operation of the traction rolls, particularly where vehicles are undergoing high speed tests.

The rigid horizontal arms 12 and 14 of hold-down mechanism 6 are sufficiently below the center line of the rear axle housing of the vehicle under test to clear the normal vehicle under-carriage and sufficient length to prevent any substantial tipping of the vertical portion of the hold-down mechanism 6 and C-clamp 7. The fore and aft tie-down chains 20 and 18 respectively, are positioned as near to the horizontal as is possible. As previously stated in the case of chain 18, the adjustment for making that chain horizontal is in linkage 11. In the case of the forward chain 20, the support 21 for roller 22 is adjustable in height so that chain 20, when tensioned to hold-down mechanism 6 and arm 14 is as nearly horizontal as it is practical to attain. Spring tension unit 19 is installed in the forward linkage and is of sufficient strength to overcome any rearward deceleration forces but is weak enough to permit thermoexpansion of the linkage system. The restraining linkage supports 21 and 11 are adjustable with each make of automobile tested so as to compensate for tire size and rear axle housing diameter so that hold-down mechanism 6 and attached arms 12 and 14 are always maintained in as nearly a horizontal position as is possible. Since the linkages are substantially horizontal and since the vehicle under test applies a horizontal force at the V-block 8, there is a slight tendency to tip the clamp mechanism 6, but with the length of the fixed arms 12 and 14, such tendency toward tipping is restrained because the rear arm 12 tends to move upward and the forearm 14 tends to move downward with a net effect of cancelling the oppositely moving vertical forces, resulting in no vertical extra forces being imposed on the rear tires which rest upon the traction rolls 16 and 16a. C-clamp 7 is clamped to the rear axle housing of the vehicle under test with the opening of the clamp facing to the rear of the vehicle to prevent any possibility that the rear axle housing might jump out of the fixture under full throttle accelerations.

Clamp carriage 44, as previously mentioned, supports the hold-down mechanism 6 when in the slack position and raises the hold-down mechanism 6 preparatory to engaging the C-clamp 7 on the rear axle housing of the vehicle under test. The carriage 44 contains microswitches 28 and 28a which will be discussed in further detail with reference to FIGS. 3 and 4. These function in such a manner that when touched by the hold-down mechanism during a dynamometer test, switches 28 and 28a are activated, and relays are in turn activated to discontinue the test. The system by which this test is accomplished is disclosed and claimed in prior application S.N. 749,020 filed by J. J. Heigl, J. A. Wilson, and the present inventor on July 16, 1958 and said disclosure is incorporated into this description by reference. In normal operation, the carriage 44 is normally locked a fraction of an inch below the hold-down mechanism 6 when in position during the test runs so that if a tire fails in a test, the rear axle housing and the hold-down mechanism 6 will be lowered and will touch the striker plates or alarm pads 39 and 39a, as shown in further detail in FIGS. 3 and 4. The hydraulically locked under-carriage 44 also serves in locked position to support the test vehicle under this condition of tire blow-out or failure and prevents damage to the wheel rims, to the vehicle, as well as damage to the traction rolls of the dynamometer.

Figure 2:
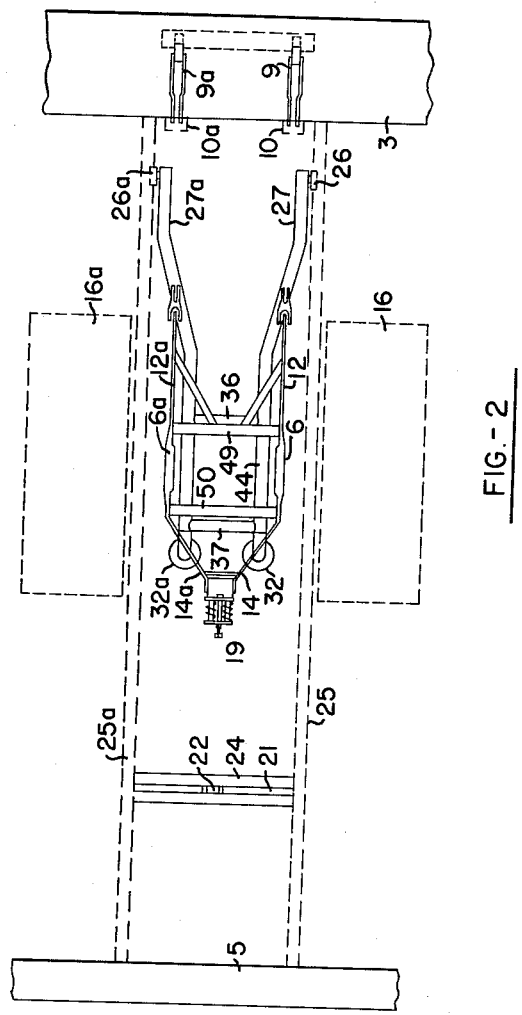
FIG. 2 is a plan view of FIG. 1.

Referring now to FIG. 2, which is a plan view of the dynamometer clamp hold-down mechanism 6 and carriage 44 (with the chains and cables 18 and 20 and the winch 23 removed), it will be seen that the parts illustrated and identified in FIG. 1 are, in most instances, duplicated so that they are in pairs in the actual devices used. In such cases, the small letter (a) is used with the same numeral to designate a comparable part which is paired and which has been previously described with respect to FIG. 1. In other words, for purposes of illustration, horizontal bar 12 of the hold-down mechanism 6 has a counterpart horizontal bar 12a. Pivoted arm 27 of the under-carriage has a counterpart 27a. Pivot or pinion 26 has a counterpart 26a and so forth.

Figure 3:
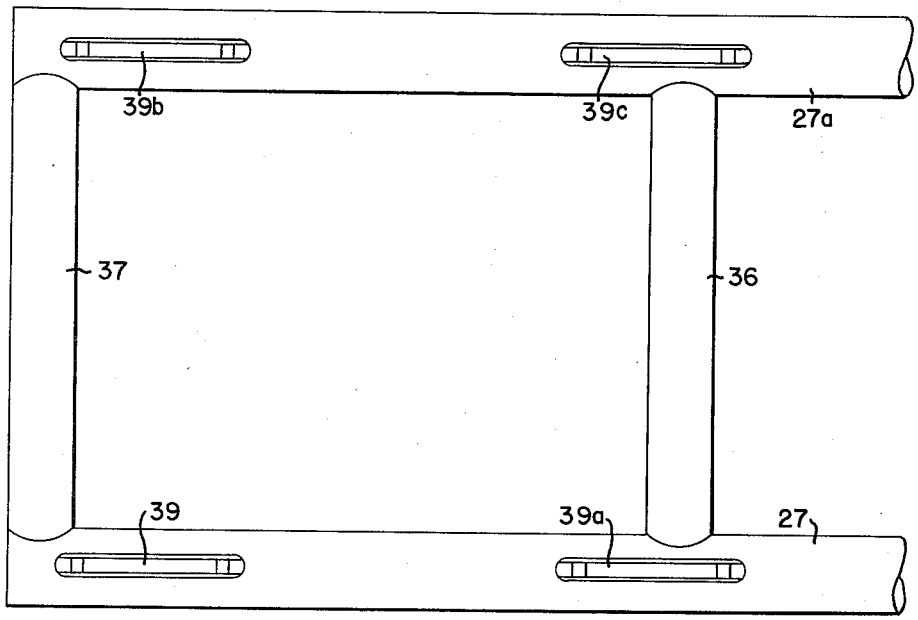
FIG. 3 is a plan view of the forward end of the carriage for the hold-down mechanism.
Figure 4:
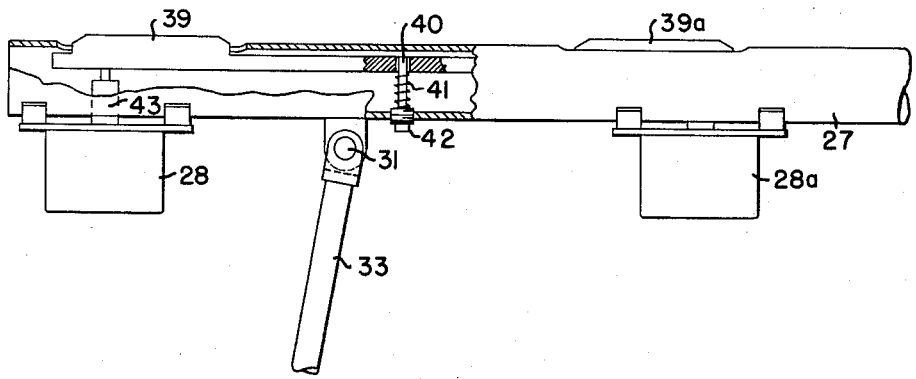
FIG. 4 shows in elevation and partial vertical section, the carriage as shown in FIG. 3, with some additional detail not shown in FIG. 3.

FIG. 3 is a plan view of the forward portion of carriage 44 and FIG. 4 is a side view, partially in section, of the same portion of carriage 44 as is shown in FIG. 3. Here again members previously identified by number are similarly identified in these two figures. Striker plates 39, 39a, 39b, and 39c, are sometimes herein referred to as alarm pads, are shown in position and, as shown in FIG. 4, are each connected to a pin 43 directly to the microswitches 28, 28a, etc., which in turn are connected into the control system previously mentioned. If and when the rear axle housing should drop, thus lowering the clamping mechanism 6 by approximately three-quarters of an inch to an inch, the bottom of the clamping mechanism 6 will strike one or more of the alarm pads 39, 39a, 39b, and 39c, and will thus actuate the microswitches 28 and 28a and so forth, thus shutting off the unit and preventing damage by reason of a tire failure during test. In order to maintain the microswitches out of continuous contact, the alarm or striking pads 39 and 39a as one pair are pivotally and spring mounted at upper end 40 of stud 42, the spring 41 surrounding this stud being under compression which tends to hold the striker plates and their connecting rods to microswitches 28, 28a, etc., in non-actuating position. A slight pressure against the spring 41 is required in order to depress striker plate 39 and activate microswitch 28. This is for the reason that otherwise there would be no positive method for keeping the respective microswitches inactivated during test, thus spring 41 serves to keep the striker plates 39 and 39a in the off position with respect to contacts and activation of the microswitches 28 and 28a.

Figure 5:
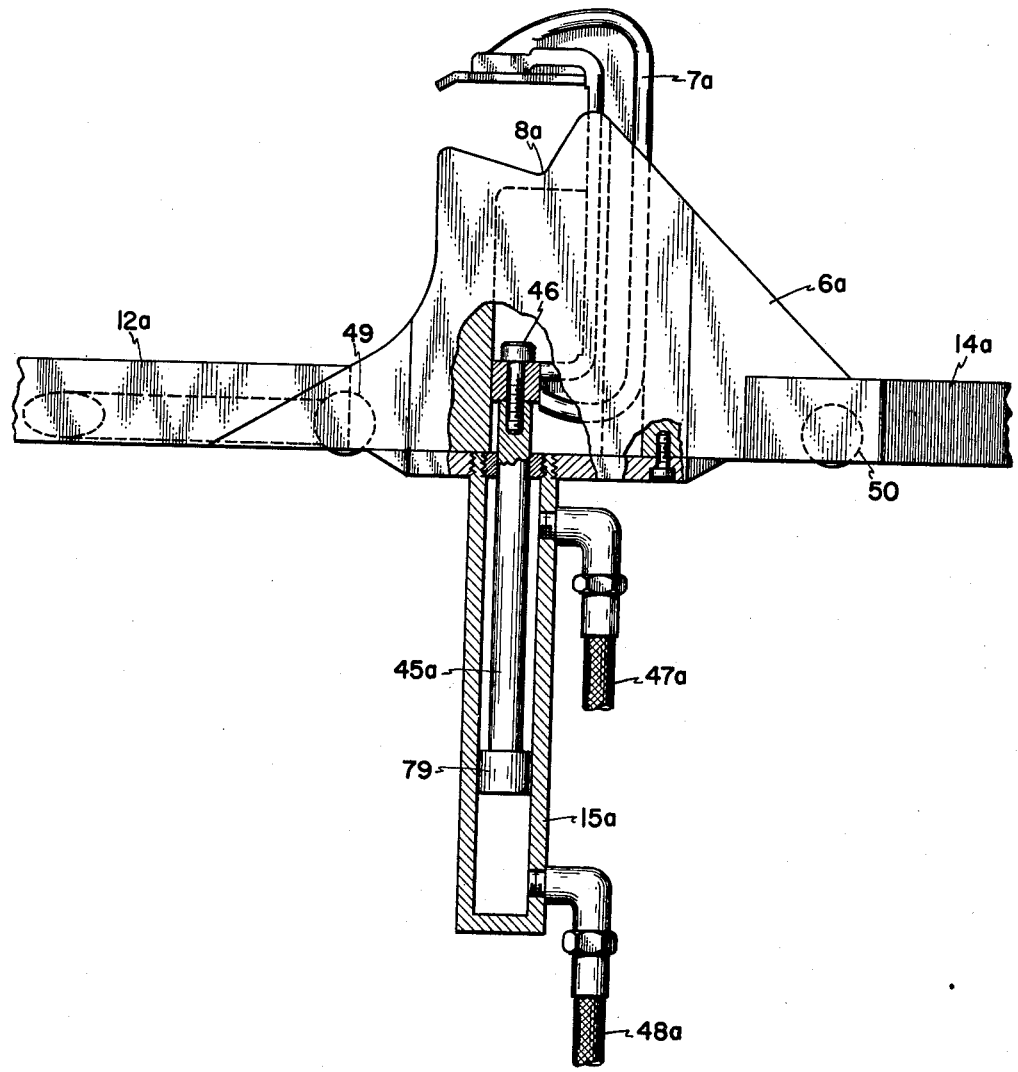
FIG. 5 is a vertical detailed view in partial section of one C-clamp 7a shown in FIG. 2.

FIG. 5 is a sectional elevation of the details of one of the two C-clamps broadly illustrated in FIG. 1. It shows the horizontal force equalizing arms 12a and 14a, the tubular rigid support members 49 and 50, and the details of the C-clamp 7a and its relationship to the notch 8a for the rear axle housing. The C-clamp 7a is bolted at its lower end to the piston rod 45a of the hydraulic cylinder 15a by means of bolt 46. It will thus be seen that piston 79 through the application of hydraulic pressure moves upwardly or downwardly in cylinder 15a. If hydraulic pressure is applied through line 48a, C-clamp 7a is opened to receive the rear axle housing. If hydraulic pressure is applied through line 47a, the C-clamp 7a is closed, thus clamping the rear axle housing in notch 8a. Generally, in dynamometer test operations, the hydraulic pressure is continued to be applied through line 47a during the entire test and, of course, the corresponding C-clamp 7 is closed also through application of hydraulic pressure in line 47 to move piston rod 45. This is shown diagrammatically in FIG. 6. At the conclusion of the dynamometer test and in order to release the C-clamp mechanism 6 and 6a, hydraulic pressure is once again applied through line 48a to piston 79.

Figure 6:
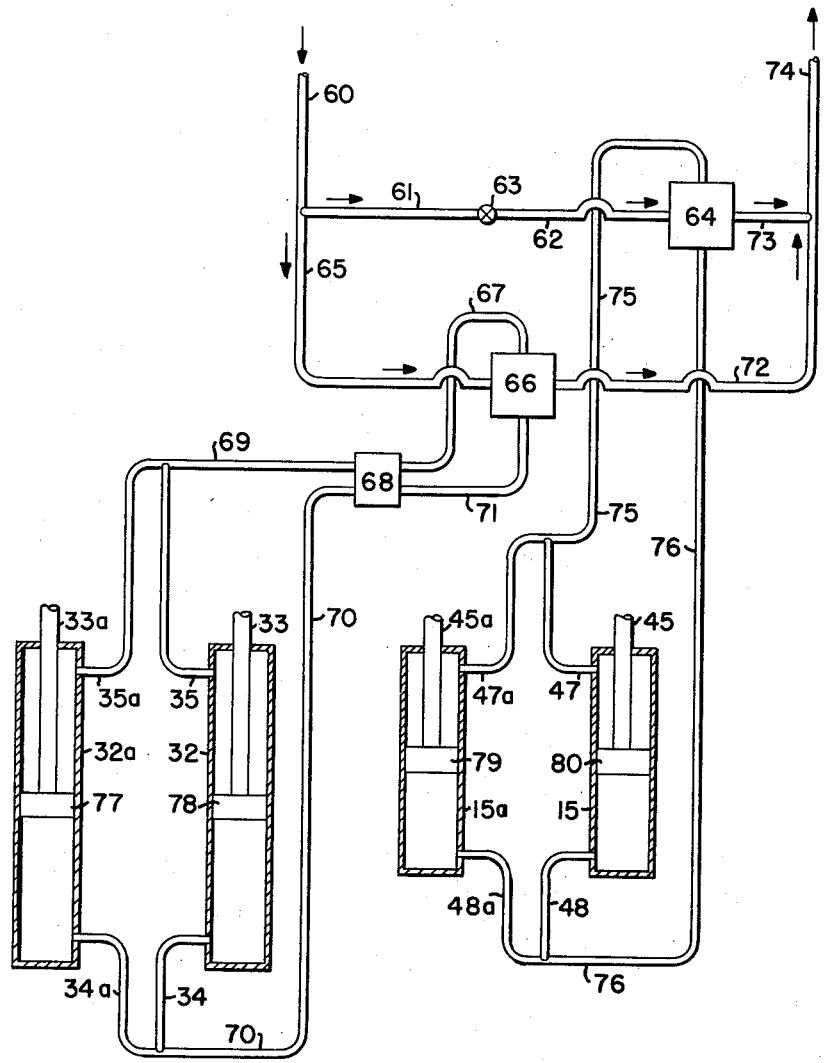
FIG. 6 is a schematic diagram of the hydraulic system used for clamping the C-clamps on the rear axle housing and the hydraulic system used for raising and lowering the under-carriage for the clamping mechanism.

Referring now to FIG. 6, which is a diagrammatic representation of the hydraulic system and of its method of operation, hydraulic fluid from the reservoir is introduced into the system through line 60 and may flow in one of two directions, either through lines 61 and 62, through check valve 63 into four-way hydraulic valve 64, or it may flow through line 65 directly into four-way hydraulic valve 66. Hydraulic valve 64 controls the operation of the hydraulic pistons 15 and 15a which operate the opening and closing of C-clamps 7 and 7a. Four-way hydraulic valve 66 controls the operation of hydraulic pistons 32 and 32a which raise and lower and position the under-carriage 44 which in turn is used as a support and means for raising and lowering the hold-down mechanism 6 and 6a. In order to raise the hold-down mechanism 44, valve 66 is opened so that hydraulic pressure and fluid from feed line 65 flows through lines 71 and 70 through parallel lines 34 and 34a into the pistons 32 and 32a, thus forcing upwardly pistons 78 and 77 which, in turn, move the piston rods 33 and 33a upwardly. At the same time hydraulic fluid is exhausted from cylinders 32 and 32a through lines 35 and 35a and lines 69 and 67. The liquid thus removed from the cylinders then flows through the relief outlet line 72, line 74, and back to the hydraulic oil storage system. Lock valve 68 which may be any standard positive pressure hydraulic lock valve and which, in the present installation, was supplied by Double A Products Company of Manchester, Michigan. When four-way control valve 66 is opened to permit hydraulic fluid to pass either through line 67 or 71 into the cylinders 32 and 32a, a simultaneous pressure is exerted against the shuttle piston which opens the opposite check valve within valve 68 allowing return flow of fluid from the cylinders. When the control valve 66 is in the neutral position, the lock valve 68 is also in neutral, i.e. both its check valves are closed, thus the hydraulic fluid in the cylinders is locked in and all possible movement of pistons 77 and 78 is prevented. Thus, valve 68 simply holds the fluid within the cylinders 32 and 32a in fixed position and prevents "creeping" or internal leakage of fluid. In other words, in order to move pistons 77 and 78, lock valve 68 requires that a positive pressure be exerted either through line 67 or through line 71 and once the positive pressure is removed as by shutting off valve 66, the pistons 78 and 77 remain stationary and do not creep.

In order to lower the carriage mechanism 44, valve 66 is opened with respect to line 67 so that the pressure from line 65 and the oil flow from the valve 66 through line 67, lock valve 68, line 69 and into cylinders 32 and 32a by means of lines 35 and 35a result in the lowering of the carriage 44 by means of the piston rods 33 and 33a. At the same time, hydraulic fluid is pushed from cylinders 32 and 32a, through lines 34 and 34a, through line 70, lock valve 68, line 71, through valve 66 into exit lines 72 and 74 and back to the oil reservoir or sump (not shown).

Similarly, to open and close the C-clamps 7 and 7a, four-way valve 64 which is usually a lever and stem operated valve, as is the case for valve 66, serves to activate pistons 79 and 80 so that in opening the C-clamps, hydraulic pressure is applied through line 76 to the lines 48 and 48a of cylinders 15 and 15a. Pistons 79 and 80 are moved upwardly, thus extending piston rods 45 and 45a and extending the C-clamps 7 and 7a to the open position. At the same time fluid is removed from the cylinders 15 and 15a through lines 47 and 47a, line 75, valve 64, and relief lines 73 and 74 and back to the oil sump.

In closing the C-clamps 7 and 7a, four-way hydraulic valve 64 is positioned so that the hydraulic pressure and fluid flow through lines 75, 47 and 47a into cylinders 15 and 15a. The pistons 79 and 80 move downwardly and the piston rods 45 and 45a recede, thus forcing the closing of C-clamps 7 and 7a. Hydraulic fluid from the bottom portion of cylinders 15 and 15a is withdrawn from the cylinders through lines 48 and 48a, through line 76, through valve 64, and into exit line 73. The oil flows then to the hydraulic fluid sump (not shown) by means of line 74.

Having now thus fully described and illustrated the character of the invention, what is desired to be secured by Letters Patent is:

1. A hold-down device for retaining an automotive vehicle on a dynamometer test stand of the traction roll type having a forward wall and a rearward wall, said device comprising (1) a hydraulically-operated C-clamp having upper and lower portions adapted to be engaged with the rear axle housing of said automotive vehicle and including a rigid arm extending forwardly from said lower portion and a rigid arm extending rearwardly from said lower portion, and (2) flexible clamp-positioning means whereby the forwardly-extending and rearwardly-extending arms of said C-clamp are attached respectively to the forward and rearward walls of said test stand, said clamp-positioning means being adapted to be tensioned substantially horizontally adjacent said C-clamp when said C-clamp is engaged with the rear axle housing of an automotive vehicle on said test stand.

2. A hold-down device according to claim 1 in which the lower portion of said C-clamp is notched to accommodate the rear axle housing of said automotive vehicle.

3. A hold-down device according to claim 1 in which said flexible clamp-positioning means comprises (1) a winch attached to the forward wall of said dynamometer test stand, (2) a first cable or the like wound at one end on said winch, (3) resilient connecting means whereby said first cable is joined at its other end to the forwardly-extending arm of said C-clamp, and (4) a second cable or the like connected at one end to the rearwardly-extending arm of said C-clamp and at its other end to the rearward wall of said test stand, said second cable being of a length to so position said C-clamp horizontally between the forward and rearward walls of said test stand that the rear axle housing of an automotive vehicle on said stand engaged by said clamp will be essentially centered on a line extending vertically through the center of the traction rolls of said test stand.

4. A hold-down device according to claim 3 in which the lower portion of said C-clamp is notched to accommodate the rear axle housing of said automotive vehicle, and which includes a roller whereover said first cable passes, said roller being located horizontally between said winch and the forwardly-extending arm of said C-clamp, and said roller further being adjustable vertically to maintain at least the portions of said first and second cables adjacent the forwardly and rearwardly-extending arms of said C-clamp in a closely-regulated horizontal attitude.

5. A hold-down device for retaining an automotive vehicle on a dynamometer test stand of the traction roll type having a forward wall and a rearward wall, said device comprising (1) a hydraulically-operated C-clamp having upper and lower portions adapted to be engaged with the rear axle housing of said automotive vehicle and including a rigid arm extending forwardly from said lower portion and a rigid arm extending rearwardly from said lower portion, (2) flexible clamp-positioning means whereby the forwardly-extending and rearwardly-extending arms of said C-clamp are attached respectively to the forward and rearward walls of said test stand, said clamp positioning means being adapted to be tensioned substantially horizontally adjacent said C-clamp when said C-clamp is engaged with the rear axle housing of an automotive vehicle on said test stand, and (3) a hydraulically-operated under-carriage for said C-clamp, said under-carriage being mounted on said test stand below said C-clamp and adapted to suport said C-clamp in direct contact therewith and to raise and lower it when said clamp-positioning means is not tensioned and said C-clamp is not engaged with the rear axle housing of an automotive vehicle on said test stand.

6. A hold-down device according to claim 5 in which that portion of the upper surface of said under-carriage adapted to be in direct contact with said C-clamp contains at least one striker plate or alarm pad or the like in direct mechanical connection with a microswitch, said microswitch being adapted to be connected electrically to shut down the dynamometer test when actuated by pressure from the C-clamp.

7. A hold-down device according to claim 5 in which the operating system of said under-carriage whereby the same is raised and lowered includes a hydraulic cylinder pivoted to said test stand, a piston in said cylinder, a piston rod extending from said piston to said undercarrage, conduit means connected to said cylinder wherethrough hydraulic fluid may be admitted thereinto and discharged therefrom to drive said piston in either direction in said cylinder, and a lock valve in said conduit means whereby creep of siad piston is substantially prevented.

References Cited in the file of this patent
UNITED STATES PATENTS

| | | |
|---|---|---|
| 976,705 | Spellman | Nov. 22, 1910 |
| 1,490,442 | Whalen | Apr. 15, 1924 |
| 1,652,225 | Wasson | Dec. 13, 1927 |
| 2,039,428 | Lewis | May 5, 1936 |